United States Patent
Su et al.

(10) Patent No.: US 11,734,795 B2
(45) Date of Patent: Aug. 22, 2023

(54) IMAGE PROCESSING METHOD AND DEVICE FOR PANORAMIC IMAGE

(71) Applicant: INDUSTRIAL TECHNOLOGY RESEARCH INSTITUTE, Hsinchu (TW)

(72) Inventors: Yan-Jen Su, Taoyuan (TW); Ruen-Rone Lee, Hsinchu (TW); Feng-Sheng Lin, Huatan Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 275 days.

(21) Appl. No.: 17/135,263

(22) Filed: Dec. 28, 2020

(65) Prior Publication Data
US 2022/0172324 A1 Jun. 2, 2022

(30) Foreign Application Priority Data
Dec. 1, 2020 (TW) .................................. 109142266

(51) Int. Cl.
*G06K 9/00* (2022.01)
*G06T 3/40* (2006.01)
(Continued)

(52) U.S. Cl.
CPC ............ *G06T 3/4038* (2013.01); *G06F 3/011* (2013.01); *G06F 3/017* (2013.01); *G06T 7/55* (2017.01);
(Continued)

(58) Field of Classification Search
CPC ....... G06T 7/55; G06T 3/0031; G06T 3/0037; G06T 3/0062; G06T 3/4038;
(Continued)

(56) References Cited

U.S. PATENT DOCUMENTS 10,499,046 B2 12/2019 Toksvig et al.
10,580,158 B1 3/2020 Mousavian et al.
(Continued)

FOREIGN PATENT DOCUMENTS

CN 110463205 A 11/2019
CN 111462311 A 7/2020
(Continued)

OTHER PUBLICATIONS

Y. Xiong and K. Pulli, "Fast panorama stitching for high-quality panoramic images on mobile phones," in IEEE Transactions on Consumer Electronics, vol. 56, No. 2, pp. 298-306, May 2010, doi: 10.1109/TCE.2010.5505931 (Year: 2010).*
(Continued)

*Primary Examiner* — Andrew M Moyer
*Assistant Examiner* — Kevin M Coomber
(74) *Attorney, Agent, or Firm* — Birch, Stewart, Kolasch & Birch, LLP

(57) ABSTRACT

A processing device and method for a panoramic image includes converting the panoramic image to a cubemap format; under the cubemap format, calculating a depth information image of the panoramic image, and performing a seamless processing on the depth information image. The format of the depth information image is converted to the original format from the cubemap format to obtain the depth information image corresponding to the panoramic image.

10 Claims, 10 Drawing Sheets

(51) Int. Cl.
*G06T 7/55* (2017.01)
*G06F 3/01* (2006.01)

(52) U.S. Cl.
CPC .............. *G06T 2207/10024* (2013.01); *G06T 2207/20084* (2013.01)

(58) Field of Classification Search
CPC . G06T 2207/10024; G06T 2207/20084; G06T 19/006; G06T 15/04; G06T 19/00; G06T 15/503; G06T 2207/20221; G06T 2207/20021; G06T 3/0087; G06T 2207/20081; G06T 17/00; G06F 3/017; G06F 3/011; H04N 5/23238; H04N 2013/0088; H04N 2013/0092; H04N 5/3415; H04N 23/698; H04N 1/3876; H04N 13/00; G06V 10/82; G06V 10/751; G06V 20/20; G02B 2027/014; G02B 30/52; G02B 30/54; G02B 13/06; G03B 37/04; G03B 37/00; G03B 35/00; G06N 20/00

See application file for complete search history.

(56) References Cited

U.S. PATENT DOCUMENTS

| | | | | |
|---|---|---|---|---|
| 2017/0094262 | A1* | 3/2017 | Peterson | G06T 15/205 |
| 2018/0138431 | A1 | 5/2018 | Simek et al. | |
| 2018/0205934 | A1* | 7/2018 | Abbas | H04N 7/015 |
| 2018/0227574 | A1* | 8/2018 | Hefeeda | H04N 13/261 |
| 2018/0302612 | A1 | 10/2018 | Kopf et al. | |
| 2019/0147661 | A1 | 5/2019 | Gervasio et al. | |
| 2019/0197667 | A1 | 6/2019 | Paluri | |
| 2019/0295282 | A1 | 9/2019 | Smolyanskiy et al. | |
| 2020/0107008 | A1 | 4/2020 | Hur et al. | |

FOREIGN PATENT DOCUMENTS

| | | |
|---|---|---|
| CN | 111563965 A | 8/2020 |
| TW | 201832184 A | 9/2018 |
| TW | I660231 B | 5/2019 |

OTHER PUBLICATIONS

P. K. Lai, S. Xie, J. Lang and R. Laganière, "Real-Time Panoramic Depth Maps from Omni-directional Stereo Images for 6 DoF Videos in Virtual Reality," 2019 IEEE Conference on Virtual Reality and 3D User Interfaces (VR), 2019, pp. 405-412, doi: 10.1109/VR.2019.8798016. (Year: 2019).*

Chen et al., "Single-Image Depth Perception in the Wild," arXiv:1604.03901v2 [cs.CV], Jan. 6, 2017, pp. 1-14.

Cheng et al., "Cube Padding for Weakly-Supervised Saliency Prediction in 360° Videos," arXiv:1806.001320v1 [cs.CV], Jun. 4, 2018, pp. 1-10.

Li et al., "MegaDepth: Learning Single-View Depth Prediction from Internet Photos," arXiv:1804.00607v4 [cs.CV], Nov. 28, 2018, pp. 1-10.

Matzen et al., "Low-Cost 360 Stereo Photography and Video Capture," ACM Transactions on Graphics, vol. 36, No. 4, Article 148, Jul. 2017, pp. 148:1-148:12.

Ranftl et al., "Towards Robust Monocular Depth Estimation: Mixing Datasets for Zero-shot Cross-dataset Transfer," IEEE Transactions on Pattern Analysis and Machine Intelligence, vol. XX, No. 11, 2020, (arXiv:1907.01341v3 [cs.CV], Aug. 25, 2018), pp. 1-14.

Zioulis et al., "OmniDepth: Dense Depth Estimation for Indoors Spherical Panoramas," ECCV18, arXiv:1807.09620 (cs), Jul. 25, 2018, pp. 1-18 (20 pages total).

Taiwanese Office Action and Search Report for Taiwanese Application No. 109142266, dated Aug. 6, 2021.

* cited by examiner

IMAGE PROCESSING METHOD AND DEVICE FOR PANORAMIC IMAGE

This application claims the benefit of Taiwan application Serial No. 109142266, filed Dec. 1, 2020, the disclosure of which is incorporated by reference herein in its entirety.

TECHNICAL FIELD

The disclosure relates in general to an image processing method and device for a panoramic image.

BACKGROUND

In the past, panoramic image normally refers to an image covering the scenery of 180° in the horizontal direction. Nowadays, along with advances in the computer graphics technology, the panoramic image refers to an image covering the scenery of 360° in the horizontal direction or an image covering the scenery of 360° in both the horizontal direction and the vertical direction (also referred to as spherical panorama). The degree of difficulty of obtaining the depth information of a panoramic image has much to do with whether the environment is an indoor environment or an outdoor environment. Generally speaking, it is more difficult to obtain the depth information of a panoramic image in an outdoor environment than an indoor environment. Moreover, the method for obtaining the depth information of a panoramic image currently available in the prior art cannot be used in the outdoor environment. Therefore, it has become a prominent task for the industry to provide a method for obtaining the depth information of a panoramic image that can be used in the indoor and the outdoor environment.

SUMMARY

According to one embodiment of the present disclosure, a processing device for a panoramic image is provided. The processing device includes a processing unit and a storage unit. The storage unit is coupled to the processing unit and used to store a computer readable medium storing instructions, wherein when the instructions are executed by the processing unit, the processing unit is configured to: obtain a first image; convert the first image with a first format to a second image with a cubemap format; duplicate two vertical view angle blocks of the second image to respectively generate three duplicate blocks and connect several horizontal view angle blocks of the second image not connected to the two vertical view angle blocks to the duplicate blocks by a corresponding connection side between each of the horizontal view angle blocks and each of the duplicate blocks to generate a third image; obtain two images with a size of 3×3 blocks from the third image to generate a fourth image and a fifth image; calculate the depth information of the fourth image and the depth information of the fifth image to generate a first depth information image corresponding to the fourth image and a second depth information image corresponding to the fifth image;

perform a first blending processing on the overlapping areas of the first depth information image and the overlapping areas of the second depth information image according to two overlapping areas of the first depth information image corresponding to two block groups of the fourth image and two overlapping areas of the second depth information image corresponding to two block groups of the fifth image; obtain several portions corresponding to the blocks of the second image from the first depth information image and the second depth information image to generate several depth information blocks; for each of the depth information blocks corresponding to the vertical view angle block, respectively connect the depth information blocks corresponding to the horizontal view angle blocks to four sides of the depth information block corresponding to the vertical view angle block by the corresponding connection side between the horizontal view angle blocks and the vertical view angle block; perform a second blending processing on several connections between the depth information blocks corresponding to vertical view angle blocks and the depth information blocks corresponding to the horizontal view angle blocks to generate a third depth information image and a fourth depth information image; obtain the depth information blocks corresponding to the blocks of the second image from the third depth information image and the fourth depth information image, and stitch the depth information blocks to form a fifth depth information image with the cubemap format; and convert the fifth depth information image with the cubemap format to a sixth depth information image with the first format.

According to another embodiment of the present disclosure, a processing method for a panoramic image is provided. The processing method includes: obtaining a first image; converting the first image with a first format to a second image with a cubemap format; duplicating two vertical view angle blocks of the second image to respectively generate three duplicate blocks, and connecting several horizontal view angle blocks of the second image not connected to the two vertical view angle blocks to the duplicate blocks by a corresponding connection side between each of the horizontal view angle blocks and each of the duplicate blocks to generate a third image; obtaining two images with a size of 3×3 blocks from the third image to generate a fourth image and a fifth image; calculating the depth information of the fourth image and the depth information of the fifth image to generate a first depth information image corresponding to the fourth image and a second depth information image corresponding to the fifth image;

performing a first blending processing on the overlapping areas of the first depth information image and the overlapping areas of the second depth information image according to two overlapping areas of the first depth information image corresponding to two block groups of the fourth image and two overlapping areas of the second depth information image corresponding to two block groups of the fifth image; obtaining several portions corresponding to the blocks of the second image from the first depth information image and the second depth information image to generate several depth information blocks; for each of the depth information blocks corresponding to the vertical view angle block, respectively connecting the depth information blocks corresponding to the horizontal view angle blocks to four sides of the depth information block corresponding to the vertical view angle block by the corresponding connection side between the horizontal view angle blocks and the vertical view angle block; performing a second blending processing on several connections between the depth information blocks corresponding to vertical view angle blocks and the depth information blocks corresponding to the horizontal view angle blocks to generate a third depth information image and a fourth depth information image;

obtaining the depth information blocks corresponding to the blocks of the second image from the third depth information image and the fourth depth information image, and stitching the depth information blocks to form a fifth depth information image with the cubemap format; and converting the fifth depth information image with the cubemap format to a sixth depth information image with the first format.

The above and other aspects of the disclosure will become better understood with regard to the following detailed description of the preferred but non-limiting embodiment (s). The following description is made with reference to the accompanying drawings.

BRIEF DESCRIPTION OF THE DRAWINGS

FIGS. 3A~3H are operation flowcharts of a processing method for a panoramic image according to an embodiment of the present disclosure.

Figure 1A:
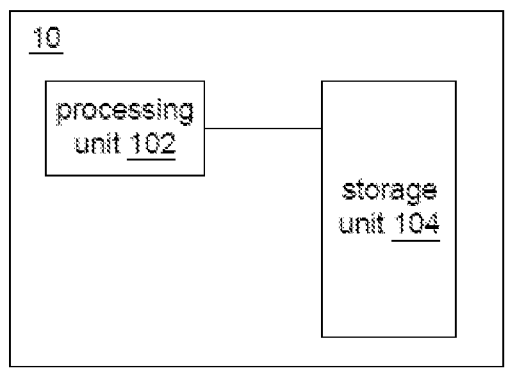
FIGS. 1A and 1B are block diagrams of a processing device for a panoramic image according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Refer to FIG. 1A. FIG. 1A is a block diagram of a processing device for a panoramic image according to an embodiment of the present disclosure. The processing device 10 includes a processing unit 102 and a storage unit 104. The processing unit 102 can be a general-purpose processor or a special purpose processing chip. The storage unit 104 can be a non-volatile memory, or a combination of non-volatile memory and volatile memory. The storage unit 104 stores a computer readable medium. When the computer readable medium is performed by the processing unit 102, the processing unit 102 performs a processing method for a panoramic image. Details of the processing method for a panoramic image are disclosed with accompanying drawings FIGS. 2A and 2B.

Figure 2A:
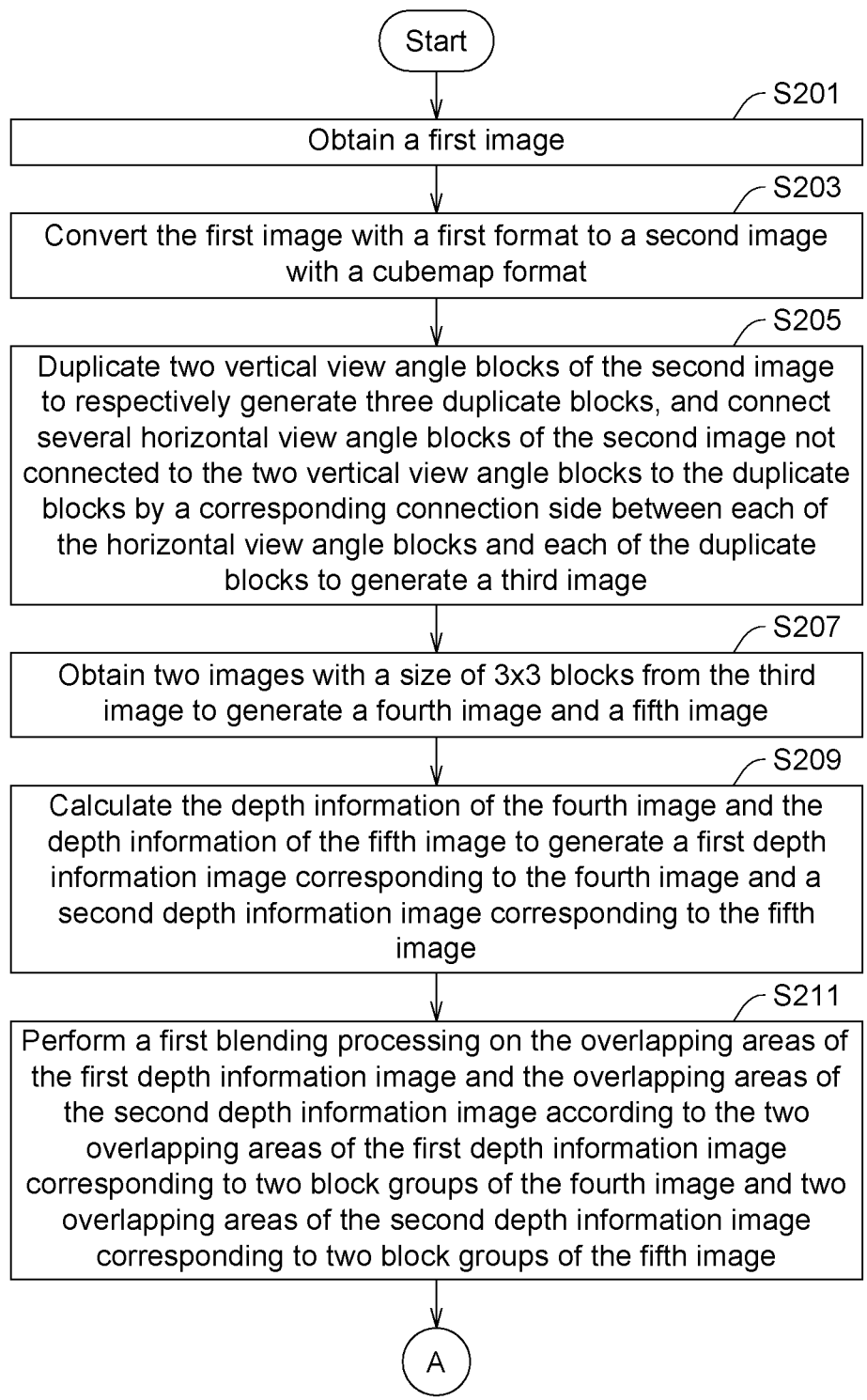
FIGS. 2A and 2B are flowcharts of a processing method for a panoramic image according to an embodiment of the present disclosure.
Figure 2B:
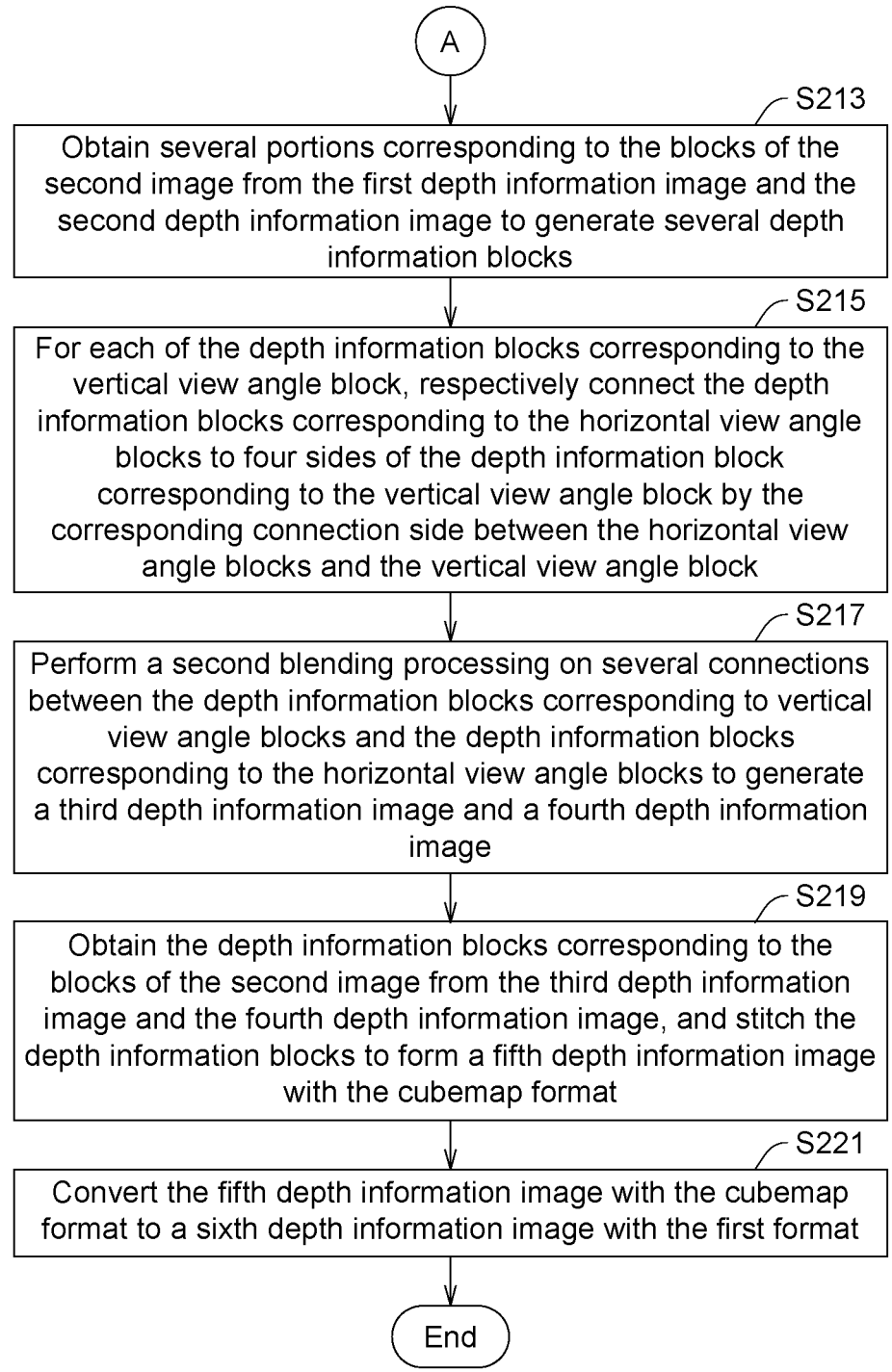

Referring to FIGS. 2A and 2B, flowcharts of a processing method for a panoramic image according to an embodiment of the present disclosure are shown. Also, refer FIGS. 3A~3H, operation flowcharts of a processing method for a panoramic image are shown.

In step S201, a first image is obtained. The first image IMG1 can be a panoramic image with a first format. The panoramic image covers the scenery of 360° in a horizontal direction and the scenery of 360° in a vertical direction (also referred to as spherical panorama). The first format can be equirectangular projection and little planet projection, but the present disclosure is not limited thereto. In an embodiment, the first image IMG1 is provided by a panorama camera. In another embodiment, the first image IMG1 can be an image data stored in the storage device 104. In the present disclosure, the source and the acquisition method of the first image IMG1 are not specified.

Figure 3A:
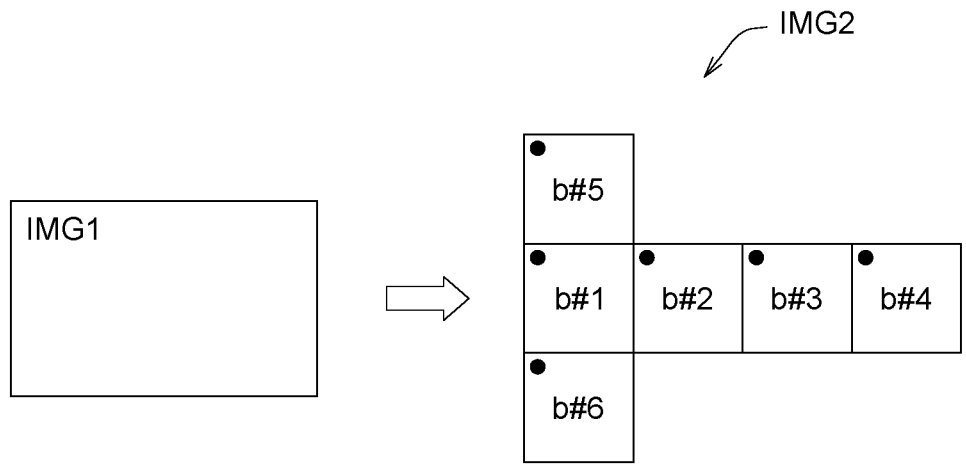
Figure 3B:
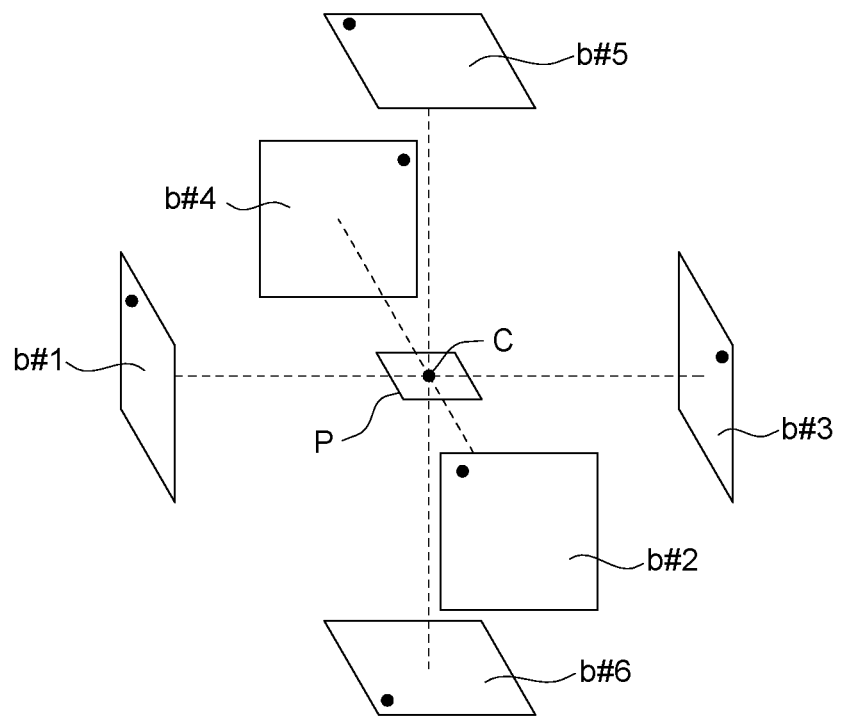

In step S203, the first image IMG1 with the first format is converted to a second image IMG2 with a cubemap format as indicated in FIG. 3A. In an embodiment, the first format and the cubemap format can be converted using any method familiar to anyone ordinary skilled in the present technology field. As indicated in FIG. 3B, the second image IMG2 includes six blocks b #1~b #6, which form a cube, wherein the four blocks b #1~b #4 correspond to four directions, namely, the forward direction, the backward direction, the leftward direction and the rightward direction parallel to the plane P on which the observation point C is located; the two blocks b #5~b #6 correspond to two directions, namely, the upward direction and the downward direction perpendicular to the plane P on which the observation point C is located. When the six blocks b #1~b #6 form a cube, any block is adjacent to only four of the remaining five blocks. For example, the block b #5 is adjacent to the blocks b #1~b #4 but not the block b #6, wherein the four sides of the block b #5 are respectively connected to one of the blocks b #1~b #4. For the present disclosure to be better understood, the relations between the blocks of the second image IMG2 are defined as follows. The four blocks b #1~b #4 corresponding to the four directions, that is, the forward direction, the backward direction, the leftward direction and the rightward direction parallel to the plane P on which the observation point C is located are defined as "horizontal view angle blocks", and the two blocks b #5~b #6 corresponding to the two directions, namely, the upward direction and the downward direction perpendicular to the plane P on which the observation point C is located are defined as "vertical view angle blocks". Of the cube formed by six blocks b #1~b #6, the "opposite block" of the block b #i is defined as the block not adjacent to the block b #i; the "adjacent blocks" of the block b #i are defined as the four blocks adjacent to the block b #i; the "adjacent block corresponding to the j-th side" of block b #i is defined as the block connected to the j-th side of the block b #i; and the "connection side" of two blocks is defined as the side connecting the two blocks, wherein i, j are positive integers, and i=1~6, j=1~4. Based on the above definitions, for the vertical view angle block b #5, the opposite block is the vertical view angle block b #6; the adjacent blocks are the horizontal view angle blocks b #1~b #4, the adjacent block corresponding to the first side (the bottom side) is the horizontal view angle block b #1; the adjacent block corresponding to the second side (the right side) is the horizontal view angle block b #2; the adjacent block corresponding to the third side (the top side) is the horizontal view angle block b #3; the adjacent block corresponding to the fourth side (the left side) is the horizontal view angle block b #4. Similarly, the connection side between the vertical view angle block b #5 and the horizontal view angle block b #2 is the right side of the vertical view angle block b #5 and the top side of the horizontal view angle block b #2. The opposite blocks, the adjacent blocks and the connection sides for other blocks can be obtained by the same analogy.

Figures 3C, 3D:
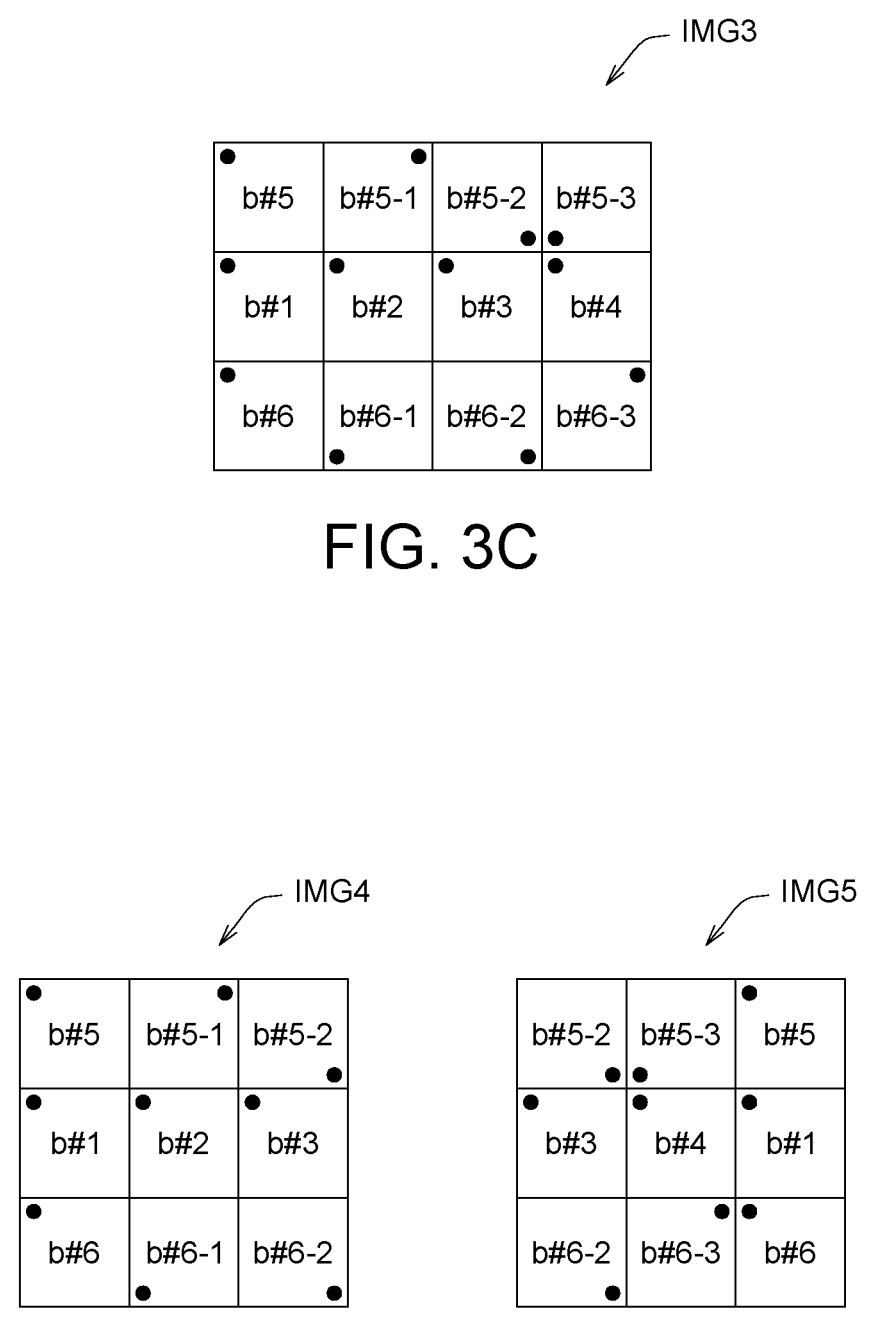

In step S205, a vertical view angle block b #5 is duplicated and rotated to generate three duplicate blocks b #5-1~b #5-3, and each of the horizontal view angle blocks b #2~b #4 not connected to the vertical view angle block b #5 is connected to one of the duplicate blocks b #5-1~b #5-3 by a corresponding connection side; the other vertical view angle block b #6 is duplicated and rotated to generate three duplicate blocks b #6-1~b #6-3, and each of the horizontal view angle blocks b #2~b #4 not connected to the vertical view angle block b #6 is connected to one of the duplicate blocks b #6-1~b #6-3 by a corresponding connection side to generate a third image IMG3. As indicated in FIG. 3C, the duplicate block b #5-1 is obtained by rotating the vertical view angle block b #5 for 90° in a clockwise direction and is connected to the top side of block b #2 by the equivalent right side of the vertical view angle block b #5; the duplicate block b #5-2 is obtained by rotating the vertical view angle block b #5 for 180° in a clockwise direction and is connected to the top side of block b #3 by the equivalent top side of the vertical view angle block b #5; the duplicate blocks b #5-3 is obtained by rotating the vertical view angle block b #5 for 270° in a clockwise direction and is connected to the top side of block b #4 by the equivalent left side of the vertical view angle block b #5; the duplicate blocks b #6-1 is obtained by rotating the vertical view angle block b #6 for 90° in an anti-clockwise direction and is connected to the bottom side of block b #2 by the equivalent right side of the vertical view angle block b #6; the duplicate blocks b #6-2 is obtained by rotating the vertical view angle block b #6 180° in an anti-clockwise direction and is connected to the bottom side of block b #3 by the equivalent bottom side of the vertical view angle block b #6; the duplicate blocks b #6-3 is obtained by rotating the vertical view angle block b #6 270° in an anti-clockwise direction and is connected to the bottom side of block b #4 by the equivalent left side of the vertical view angle block b #6.

In step S207, two images with a size of 3×3 blocks are obtained from the third image IMG3 to generate a fourth image IMG4 and a fifth image IMG5, wherein the fourth image IMG4 and the fifth image IMG5 includes the combination of three non-repeated blocks composed of the blocks and the duplicated blocks and six repeated blocks composed of the blocks and the duplicate blocks. The six repeated blocks include two block groups, wherein each block group includes the combination of three connected blocks and duplicate blocks, and the two block groups are not connected. As indicated in FIG. 3D, the fourth image IMG4 includes five blocks b #1, b #2, b #3, b #5 and b #6 and four duplicate blocks b #5-1, b #5-2, b #6-1 and b #6-2; the fifth image IMG5 includes five non-duplicate blocks b #1, b #3, b #4, b #5 and b #6 and four duplicate blocks b #5-2, b #5-3, b #6-2 and b #6-3. That is, for the fourth image IMG4 and the fifth image IMG5, the repeated block groups are [b #1, b #5, b #6] and [b #3, b #5-2, b #6-2], and the two block groups are not connected to each other.

Figure 3E:
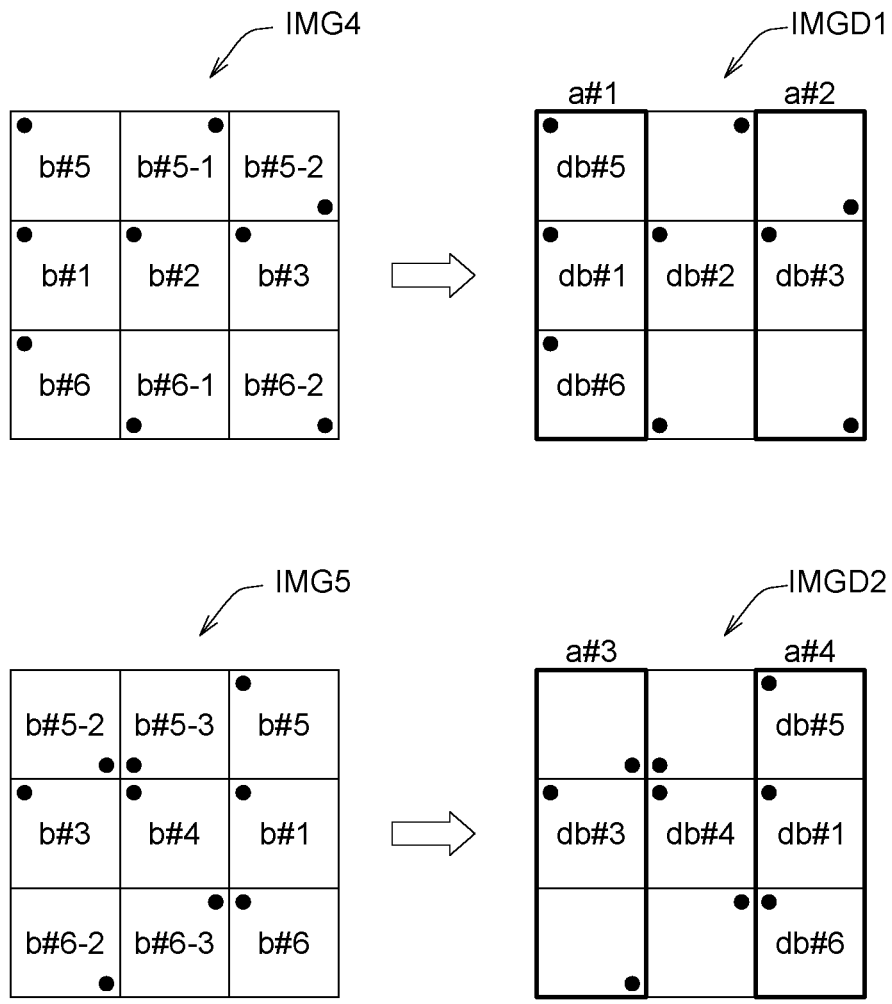

In step S209, the depth information of the fourth image IMG4 and the depth information of the fifth image IMG5 are calculated to generate a first depth information image IMGD1 corresponding to the fourth image IMG4 and a second depth information image IMGD2 corresponding to the fifth image IMG5 as indicated in FIG. 3E. In an embodiment, the fourth image IMG4 and the fifth image IMG5 are transmitted to a neural network which performs calculation to generate the first depth information image IMGD1 and the second depth information image IMGD2.

In step S211, a first blending processing is performed on two overlapping areas a #1 and a #2 of the first depth information image IMGD1 corresponding to two block groups of the fourth image IMG4 and two overlapping areas a #1 and a #2 of the second depth information image IMGD2 corresponding to two block groups of the fifth image IMG5 according to the two overlapping areas a #1 and a #2 of the first depth information image IMGD1 corresponding to two block groups of the fourth image IMG4 and the two overlapping areas a #3 and a #4 of the second depth information image IMGD2 corresponding to two block groups of the fifth image IMG5. According to the first blending processing, the depth value of each pixel in the overlapping area a #1 of the first depth information image corresponding to the blocks b #1, b #5 and b #6 and the depth value of corresponding pixel in the overlapping area a #4 of the second depth information image corresponding to the blocks b #1, b #5 and b #6 are used as the depth value of each pixel of the first depth image and the depth value of corresponding pixel in the second depth image according to the horizontal distance from the pixel to block boundary, and the depth value of each pixel in the overlapping area a #2 of the first depth information image corresponding to the blocks b #3, b #5-2 and b #6-2 and the depth value of corresponding pixel in the overlapping area a #3 of the second depth information image corresponding to the blocks b #3, b #5-2 and b #6-2 are used as the depth value of the pixel of the first depth image and the depth value of corresponding pixel in the second depth image according to the inverse average of the horizontal distance from the pixel to block boundary. It should be noted that the algorithm is used in the first blending processing is inverse distance average, but the present disclosure is not limited thereto. In other embodiments, the algorithm can be the average value method or Poisson blending.

Figure 3F:
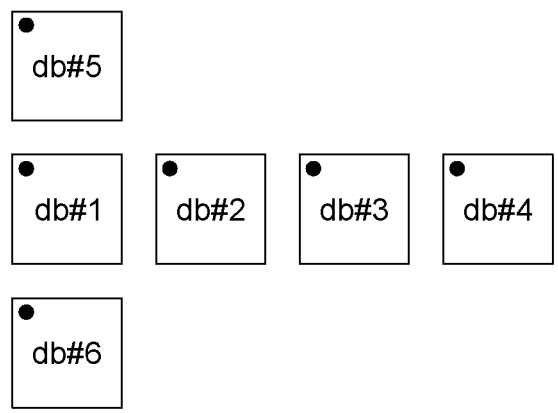

In step S213, six portions corresponding to six blocks b #1~b #6 of the second image IMG2 are obtained from the first depth information image IMGD1 and the second depth information image IMGD2 to generate six depth information blocks db #1~db #6 as indicated in FIG. 3F.

Figure 3G:
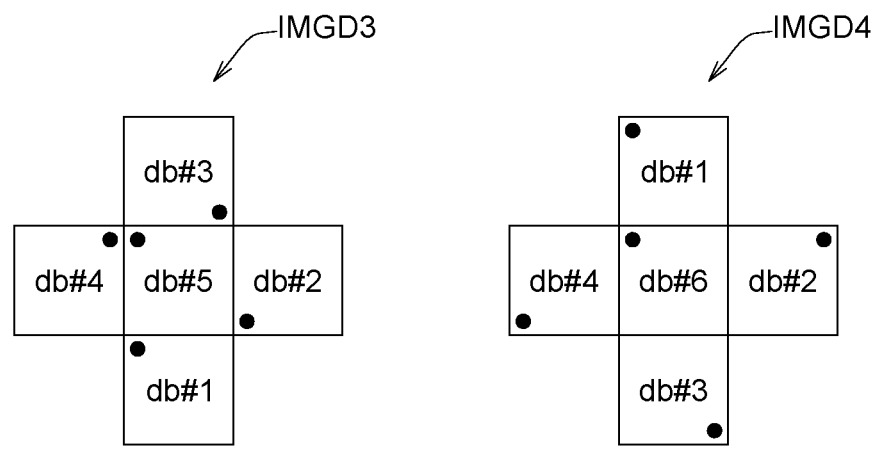

In step S215, for each of the depth information blocks db #5 and db #6 corresponding to the vertical view angle blocks b #5 and b #6, the four depth information blocks db #1~db #4 corresponding to the horizontal view angle blocks b #1~b #4 are respectively connected to the four sides of each of the depth information blocks db #5 and db #6 corresponding to the vertical view angle blocks b #5 and b #6 by the corresponding connection sides between the horizontal view angle blocks b #1~b #4 and the vertical view angle blocks b #5 and b #6 as indicated in FIG. 3G.

In step S217, a second blending processing is performed on several connections between the depth information blocks db #5 and db #6 corresponding to the vertical view angle blocks b #5 and b #6 and the depth information blocks db #1~db #4 corresponding to the horizontal view angle blocks b #1~b #4 to generate a third depth information image IMGD3 and a fourth depth information image IMGD4 as indicated in FIG. 3G. The second blending processing is such as Poisson blending processing or blurring the intersection between the vertical view angle blocks b #5 and b #6 and the horizontal view angle blocks b #1~b #4.

Figure 3H:
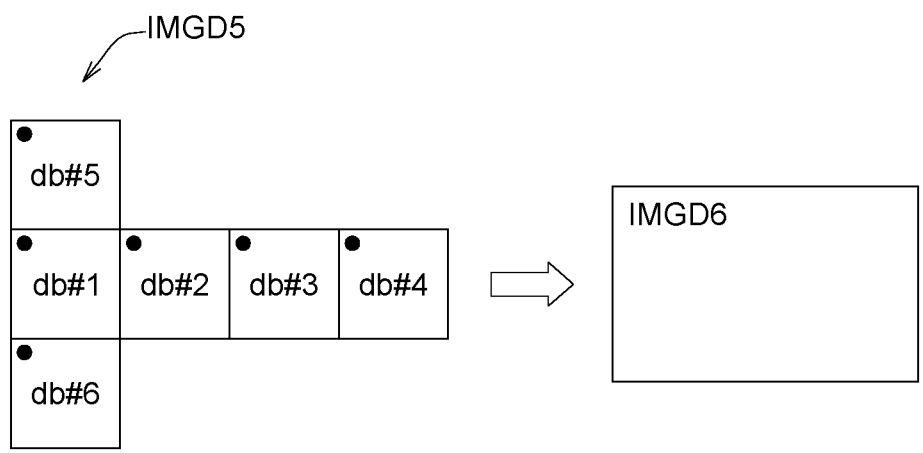

In step S219, several depth information blocks db #1~db #6 corresponding to each of the blocks b #1~b #6 of the second image IMG2 are obtained from the third depth information image IMGD3 and the fourth depth information image IMGD4, and the depth information blocks db #1~db #6 are stitched to form a fifth depth information image IMGD5 with the cubemap format according to the position relation between the blocks b #1~b #6 of the second image IMG2 as indicated in FIG. 3H.

In step S221, the fifth depth information image IMGD5 with the cubemap format is converted to a sixth depth information image IMGD6 with the first format as indicated in FIG. 3H.

Figure 1B:
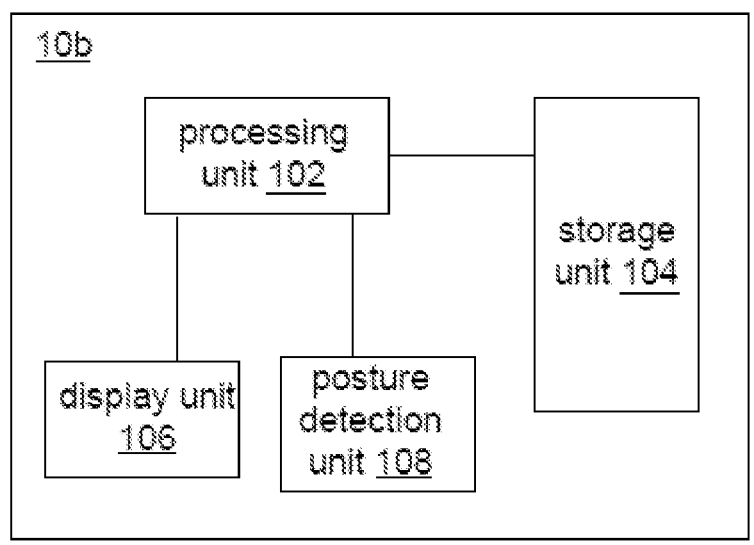
Figure 4:
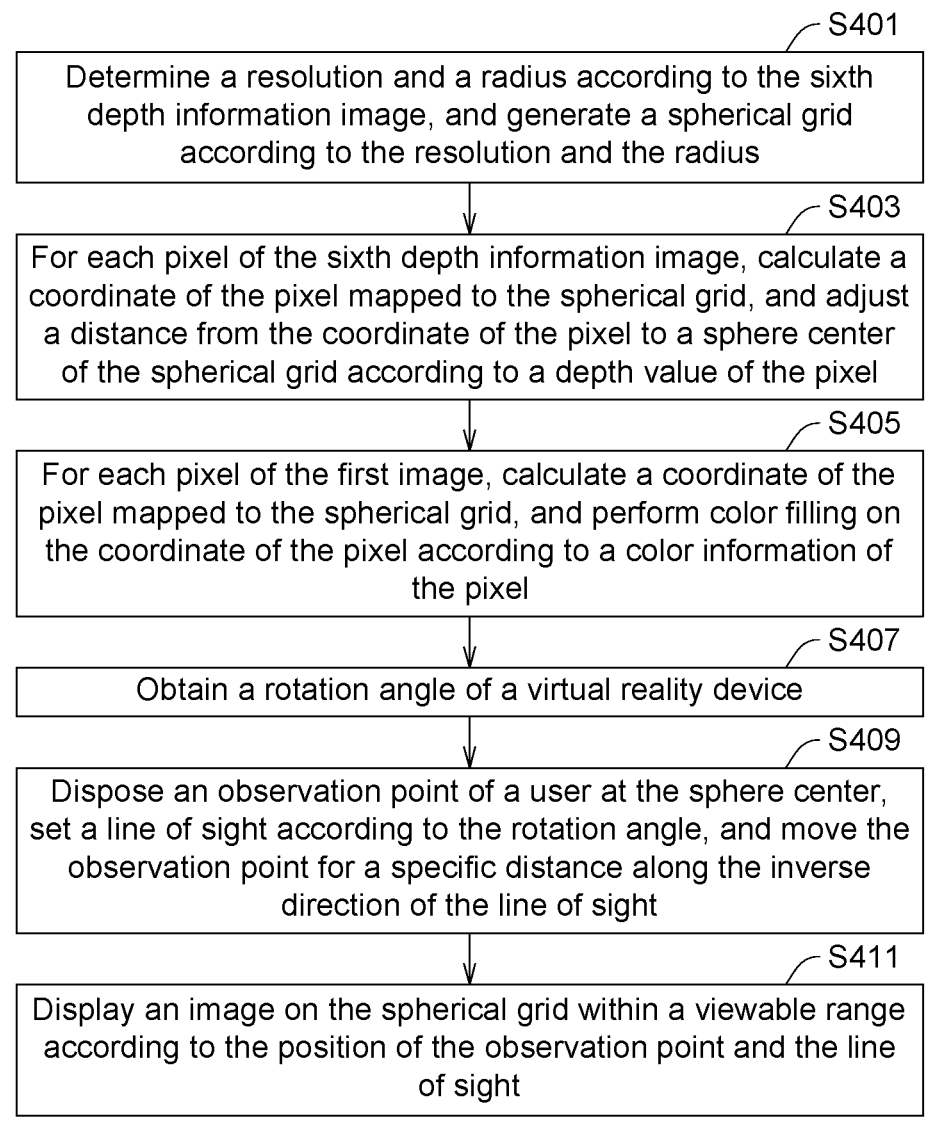
FIG. 4 is a flowchart continuing the flowcharts of the processing method for a panoramic image of FIGS. 2A and 2B according to another embodiment of the present disclosure.

Thus, the sixth depth information image IMGD6 with the depth information of the first image IMG1 can be obtained. The combination of the sixth depth information image IMGD6 and the first image IMG1 can achieve various applications. In an embodiment, the combination of the sixth depth information image IMGD6 and the first image IMG1 can be used in virtual reality device. In an embodiment, the processing device 10b, such as a virtual reality device, further includes a display unit 106 and a posture detection unit 108 coupled to the processing unit, as shown in FIG. 1B. The posture detection unit 108 is used to obtain a rotation angle of the processing device 10b. The processing method for a panoramic image can further include the steps of FIG. 4.

In step S401, a resolution and a radius are determined according to the sixth depth information image IMGD6, and a spherical grid is generated according to the resolution and the radius. In actual application, the processing unit further determines the resolution and the radius according to the efficiency and actual configuration of the display unit of the virtual reality device.

In step S403, for each pixel of the sixth depth information image IMGD6, a coordinate of the pixel mapped to the spherical grid is calculated, and a distance from the coordinate of the pixel to a sphere center of the spherical grid is adjusted according to a depth value of the pixel.

In step S405, for each pixel of the first image IMG1, a coordinate of the pixel mapped to the spherical grid is calculated, and color filling is performed on the coordinate of the pixel according to a color information of the pixel.

Coordinate conversion between the pixel with the first format and the spherical grid can be calculated using any method familiar to anyone ordinarily skilled in the present technology field, and the present disclosure does not have specific restrictions.

In step S407, a rotation angle of a virtual reality device is obtained. In an embodiment, the posture detection unit includes an inertial measurement module (IMU) and/or a space positioning module (such as lighthouse, SLAM tracking) used to obtain the rotation angle.

In step S409, an observation point of a user is imposed at the sphere center, a line of sight is set according to the rotation angle, and the observation point is moved for a specific distance along the inverse direction of the line of sight.

In step S411, an image on the spherical grid within a viewable range is displayed according to the position of the observation point and the line of sight.

As the observation point is zoomed out, the displayed image with the depth information will provide a sense of distance. Thus, the user's feeling of object distance in the image can be enhanced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A processing device for a panoramic image, comprising:
   a processing unit;
   a storage unit coupled to the processing unit used to store a computer readable medium storing instructions, wherein when the instructions are executed by the processing unit, the processing unit is configured to:
      obtain a first image;
      convert the first image with a first format to a second image with a cubemap format;
      duplicate two vertical view angle blocks of the second image to respectively generate three duplicate blocks and connect a plurality of horizontal view angle blocks of the second image not connected to the two vertical view angle blocks to the duplicate blocks by a corresponding connection side between each of the horizontal view angle blocks and each of the duplicate blocks to generate a third image;
      obtain two images with a size of 3×3 blocks from the third image to generate a fourth image and a fifth image;
      calculate the depth information of the fourth image and the depth information of the fifth image to generate a first depth information image corresponding to the fourth image and a second depth information image corresponding to the fifth image;
      perform a first blending processing on the overlapping areas of the first depth information image and the overlapping areas of the second depth information image according to two overlapping areas of the first depth information image corresponding to two block groups of the fourth image and two overlapping areas of the second depth information image corresponding to two block groups of the fifth image;
      obtain a plurality of portions corresponding to the blocks of the second image from the first depth information image and the second depth information image to generate a plurality of depth information blocks;
      for each of the depth information blocks corresponding to the vertical view angle block, respectively connect the depth information blocks corresponding to the horizontal view angle blocks to four sides of the depth information block corresponding to the vertical view angle block by the corresponding connection side between the horizontal view angle blocks and the vertical view angle block;
      perform a second blending processing on a plurality of connections between the depth information blocks corresponding to vertical view angle blocks and the depth information blocks corresponding to the horizontal view angle blocks to generate a third depth information image and a fourth depth information image;
      obtain the depth information blocks corresponding to the blocks of the second image from the third depth information image and the fourth depth information image, and stitch the depth information blocks to form a fifth depth information image with the cubemap format; and
      convert the fifth depth information image with the cubemap format to a sixth depth information image with the first format.

2. The processing device according to claim 1, further comprising a display unit and a posture detection unit respectively coupled to the processing unit, the posture detection unit is used to obtain a rotation angle, wherein the processing unit forms an image on the display unit according to the first image, the sixth depth information image and the rotation angle.

3. The processing device according to claim 1, wherein when the instructions are executed by the processing unit, the processing unit is configured to:
   determine a resolution and a radius according to the sixth depth information image, and generate a spherical grid according to the resolution and the radius;
   for each pixel of the sixth depth information image, calculate a coordinate of the pixel mapped to the spherical grid, and adjust a distance from the coordinate of the pixel to a sphere center of the spherical grid according to a depth value of the pixel;

for each pixel of the first image, calculate a coordinate of the pixel mapped to the spherical grid, and perform color filling on the coordinate of the pixel according to a color information of the pixel;

obtain a rotation angle of a virtual reality device;

dispose an observation point of a user at the sphere center, set a line of sight according to the rotation angle, and move the observation point for a specific distance along the inverse direction of the line of sight; and display an image on the spherical grid within a viewable range according to the position of the observation point and the line of sight.

4. The processing device according to claim 1, wherein the second blending processing is Poisson blending processing.

5. The processing device according to claim 1, wherein when calculating the depth information of the fourth image and the fifth image to generate a first depth information image corresponding to the fourth image and a second depth information image corresponding to the fifth image, the fourth image and the fifth image are transmitted to a neural network which performs calculation to obtain the first depth information image and the second depth information image.

6. A processing method for a panoramic image, comprising:

obtaining a first image;

converting the first image with a first format to a second image with a cubemap format;

duplicating two vertical view angle blocks of the second image to respectively generate three duplicate blocks, and connecting a plurality of horizontal view angle blocks of the second image not connected to the two vertical view angle blocks to the duplicate blocks by a corresponding connection side between each of the horizontal view angle blocks and each of the duplicate blocks to generate a third image;

obtaining two images with a size of 3×3 blocks from the third image to generate a fourth image and a fifth image;

calculating the depth information of the fourth image and the depth information of the fifth image to generate a first depth information image corresponding to the fourth image and a second depth information image corresponding to the fifth image;

performing a first blending processing on the overlapping areas of the first depth information image and the overlapping areas of the second depth information image according to two overlapping areas of the first depth information image corresponding to two block groups of the fourth image and two overlapping areas of the second depth information image corresponding to two block groups of the fifth image;

obtaining a plurality of portions corresponding to the blocks of the second image from the first depth information image and the second depth information image to generate a plurality of depth information blocks;

for each of the depth information blocks corresponding to the vertical view angle block, respectively connecting the depth information blocks corresponding to the horizontal view angle blocks to four sides of the depth information block corresponding to the vertical view angle block by the corresponding connection side between the horizontal view angle blocks and the vertical view angle block;

performing a second blending processing on a plurality of connections between the depth information blocks corresponding to vertical view angle blocks and the depth information blocks corresponding to the horizontal view angle blocks to generate a third depth information image and a fourth depth information image;

obtaining the depth information blocks corresponding to the blocks of the second image from the third depth information image and the fourth depth information image, and stitching the depth information blocks to form a fifth depth information image with the cubemap format; and converting the fifth depth information image with the cubemap format to a sixth depth information image with the first format.

7. The processing method according to claim 6, further comprising obtaining a rotation angle using a posture detection unit and forming an image on a display unit according to the first image, the sixth depth information image and the rotation angle.

8. The processing method according to claim 6, further comprising:

determining a resolution and a radius according to the sixth depth information image, and generating a spherical grid according to the resolution and the radius;

for each pixel of the sixth depth information image, calculating a coordinate of the pixel mapped to the spherical grid, and adjusting a distance from the coordinate of the pixel to a sphere center of the spherical grid according to a depth value of the pixel;

for each pixel of the first image, calculating a coordinate of the pixel mapped to the spherical grid, and performing color filling on the coordinate of the pixel according to a color information of the pixel;

obtaining a rotation angle of a virtual reality device;

disposing an observation point of a user at the sphere center, setting a line of sight according to the rotation angle, and moving the observation point for a specific distance along the inverse direction of the line of sight; and displaying an image on the spherical grid within a viewable range according to the position of the observation point and the line of sight.

9. The processing method according to claim 6, wherein the second blending processing is Poisson blending processing.

10. The processing method according to claim 6, wherein when calculating the depth information of the fourth image and the fifth image to generate a first depth information image corresponding to the fourth image and a second depth information image corresponding to the fifth image, the fourth image and the fifth image are transmitted to a neural network which performs calculation to obtain the first depth information image and the second depth information image.

* * * * *